United States Patent
Antony (10) Patent No.: US 10,348,628 B2
(45) Date of Patent: Jul. 9, 2019

(54) PLACEMENT OF VIRTUAL MACHINES IN A VIRTUALIZED COMPUTING ENVIRONMENT

(71) Applicant: VMware, Inc., Palo Alto, CA (US)

(72) Inventor: Jinto Antony, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 561 days.

(21) Appl. No.: 14/024,652

(22) Filed: Sep. 12, 2013

(65) Prior Publication Data

US 2015/0074262 A1    Mar. 12, 2015

(51) Int. Cl.
*G06F 15/16* (2006.01)
*H04L 12/803* (2013.01)
*H04L 12/713* (2013.01)
*H04L 12/707* (2013.01)
*H04L 12/717* (2013.01)

(52) U.S. Cl.
CPC ............ *H04L 47/125* (2013.01); *H04L 45/22* (2013.01); *H04L 45/42* (2013.01); *H04L 45/586* (2013.01)

(58) Field of Classification Search
CPC . H04L 67/1002; H04L 67/1031; H04L 43/16; H04L 43/04; H04L 67/1023; H04L 67/1063; H04L 43/0882; H04L 45/50; G06F 2009/4557; G06F 9/4856; G06F 9/45558
USPC ..... 709/223–224, 249, 226; 711/9; 718/105, 718/1; 370/252
See application file for complete search history.

(56) References Cited

U.S. PATENT DOCUMENTS

| | | | | |
|---|---|---|---|---|
| 7,203,944 | B1 * | 4/2007 | van Rietschote | G06F 9/45533 718/1 |
| 7,480,719 | B2 * | 1/2009 | Inoue | G06F 9/485 707/999.002 |
| 8,010,676 | B1 * | 8/2011 | Battersby | H04L 47/70 709/226 |
| 8,027,354 | B1 * | 9/2011 | Portolani | H04L 49/70 370/395.2 |
| 8,102,781 | B2 * | 1/2012 | Smith | G06F 9/4856 370/252 |
| 8,145,760 | B2 * | 3/2012 | Dinda | G06F 9/4887 709/226 |
| 8,185,893 | B2 * | 5/2012 | Hyser | G06F 9/5027 718/1 |
| 8,250,182 | B2 * | 8/2012 | Frank | H04L 47/125 709/203 |
| 8,386,610 | B2 * | 2/2013 | Yahalom | G06F 3/0605 709/226 |
| 8,589,921 | B2 * | 11/2013 | Heim | G06F 9/45558 718/1 |
| 8,793,687 | B2 * | 7/2014 | Kidambi | H04L 49/70 718/1 |
| 8,826,274 | B2 * | 9/2014 | Moriki | G06F 9/45558 718/1 |

(Continued)

*Primary Examiner* — Douglas B Blair (57) ABSTRACT

Techniques for placement of a virtual machine (VM) on a host computing system in a virtualized computing environment are disclosed. In one embodiment, a first network device having network load less than a threshold value is determined. Further, the VM is placed on the host computing system coupled to the first network device. In this case, the host computing system transmits and receives network traffic associated with the VM via the first network device.

24 Claims, 4 Drawing Sheets

(56) References Cited

U.S. PATENT DOCUMENTS

| | | | | |
|---|---|---|---|---|
| 8,826,292 B2* | 9/2014 | Heim | G06F 9/5088 | 718/1 |
| 8,898,295 B2* | 11/2014 | Agiwal | H04L 43/0882 | 370/343 |
| 8,954,535 B2* | 2/2015 | Rijsman | H04L 47/2408 | 370/230 |
| 8,990,431 B2* | 3/2015 | Goel | H04L 67/1002 | 370/235 |
| 9,524,179 B2* | 12/2016 | Vinberg | G06F 9/45533 | |
| 10,203,993 B2* | 2/2019 | Gopisetty | G06F 9/5088 | |
| 2006/0230407 A1* | 10/2006 | Rosu | G06F 9/5088 | 718/105 |
| 2008/0082977 A1* | 4/2008 | Araujo | G06F 9/455 | 718/1 |
| 2008/0201414 A1* | 8/2008 | Amir Husain | G06F 9/445 | 709/203 |
| 2009/0055507 A1* | 2/2009 | Oeda | G06F 9/4856 | 709/216 |
| 2010/0161805 A1* | 6/2010 | Yoshizawa | G06F 9/5077 | 709/226 |
| 2010/0161922 A1* | 6/2010 | Sharp | G06F 9/45558 | 711/162 |
| 2010/0211956 A1* | 8/2010 | Gopisetty | G06F 9/505 | 718/104 |
| 2011/0023114 A1* | 1/2011 | Diab | G06F 9/4856 | 726/22 |
| 2011/0238817 A1* | 9/2011 | Okita | H04L 41/142 | 709/224 |
| 2012/0036515 A1* | 2/2012 | Heim | G06F 9/5088 | 718/105 |
| 2012/0066371 A1* | 3/2012 | Patel | H04L 67/1031 | 709/224 |
| 2012/0195187 A1* | 8/2012 | Ashihara | G06F 9/46 | 370/220 |
| 2012/0210416 A1* | 8/2012 | Mihelich | H04L 63/0218 | 726/11 |
| 2013/0054813 A1* | 2/2013 | Bercovici | G06F 9/45533 | 709/226 |
| 2013/0086236 A1* | 4/2013 | Baucke | H04L 45/50 | 709/223 |
| 2013/0104128 A1* | 4/2013 | Kurita | G06F 9/45558 | 718/1 |
| 2013/0151831 A1* | 6/2013 | Bealkowski | G06F 9/4401 | 713/2 |
| 2013/0159487 A1* | 6/2013 | Patel | H04L 67/1031 | 709/223 |
| 2013/0247034 A1* | 9/2013 | Messerli | G06F 9/45533 | 718/1 |
| 2013/0301413 A1* | 11/2013 | Moen | H04L 67/1002 | 370/235 |
| 2014/0040886 A1* | 2/2014 | Coles | G06F 9/4401 | 718/1 |
| 2014/0115168 A1* | 4/2014 | Yamashima | G06F 9/5077 | 709/226 |
| 2014/0115183 A1* | 4/2014 | Mitsunobu | H04L 47/621 | 709/232 |
| 2014/0143777 A1* | 5/2014 | Guo | G06F 9/50 | 718/1 |
| 2014/0215045 A1* | 7/2014 | Wang | H04L 67/10 | 709/223 |
| 2014/0304393 A1* | 10/2014 | Annamalaisami | H04L 43/04 | 709/224 |
| 2015/0026344 A1* | 1/2015 | Ravinoothala | H04L 47/125 | 709/226 |
| 2015/0326454 A1* | 11/2015 | Geis | H04L 67/1063 | 709/226 |
| 2016/0077935 A1* | 3/2016 | Zheng | G06F 11/2028 | 714/4.12 |
| 2016/0080201 A1* | 3/2016 | Huang | H04L 41/5054 | 709/221 |

* cited by examiner

PLACEMENT OF VIRTUAL MACHINES IN A VIRTUALIZED COMPUTING ENVIRONMENT

TECHNICAL FIELD

The present disclosure relates to methods, techniques, and systems for network resource management in a virtualized computing environment and, more particularly, to methods, techniques, and systems for placement of virtual machines (VMs) in the virtualized computing environment.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "host computing systems"). A group of hardware computing platforms may be organized as a cluster to provide hardware resources, such as memory, central processing units (CPUs) and so on, for VMs. In a data center, it is common to see multiple network switches and multiple VMs running on multiple clusters of host computing systems with each host computing system coupled to at least one of the multiple network switches. Typically, in the data center, multiple VMs can be migrated between the host computing systems, which may result in unbalanced network traffic. In this case, some network switches can be overloaded and some can be underutilized.

BRIEF DESCRIPTION OF THE DRAWINGS

The drawings described herein are for illustration purposes only and are not intended to limit the scope of the present subject matter in any way.

DETAILED DESCRIPTION

Embodiments described herein provide enhanced computer-based and network-based methods, techniques, and systems for placement of a virtual machine (VM) in a virtualized computing environment. The term "virtualized computing environment" is used herein to refer to a physical infrastructure that hosts a virtual infrastructure comprising virtual objects, such as virtual machines (VMs), virtual data centers (VDCs), and virtual appliances (vApps). In the virtualized computing environment with multiple host computing systems running multiple VMs and connected to multiple network devices (e.g., network switches), there can be some network devices which are overloaded and some network devices which are underutilized. The term "network switch" is used in the following description, however, in the present invention it is used broadly to refer to any network device capable of routing/carrying the network traffic, such as routers, switches, multi-function devices having a routing function, edge gateways, and so on. The term "placement of a VM" refers to identifying a host computing system with enough computing resources and allocating the computing resources for the newly created VM in the virtualized computing environment.

The present technique determines a network switch having network load less than a threshold value, identifies host computing systems coupled to the network switch, and places the VM on one of the identified host computing systems having available computing resources to host the VM. The present technique further determines whether the network traffic at the network switch is still less than or equal to the threshold value upon placing the VM. If the network traffic at the network switch is greater than the threshold value, the present technique initiates migration (e.g., live migration) of the VM to other host computing system coupled to any other network switch and/or instructs a virtual switch of the host computing system to route the network traffic between the VM and other network switch based on a network topology map and network traffic at the other network switches. The term "network topology map" refers to a map showing the relationships/connections between the network switches, host computing systems, virtual switches and VMs in the virtualized computing environment. For example, the network topology map is used to determine the interconnections between the network switches and the host computing systems. In one embodiment, a resource scheduling framework can manage selection of network switches to route the network traffic associated with the VM and selection of host computing systems to migrate the VM.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
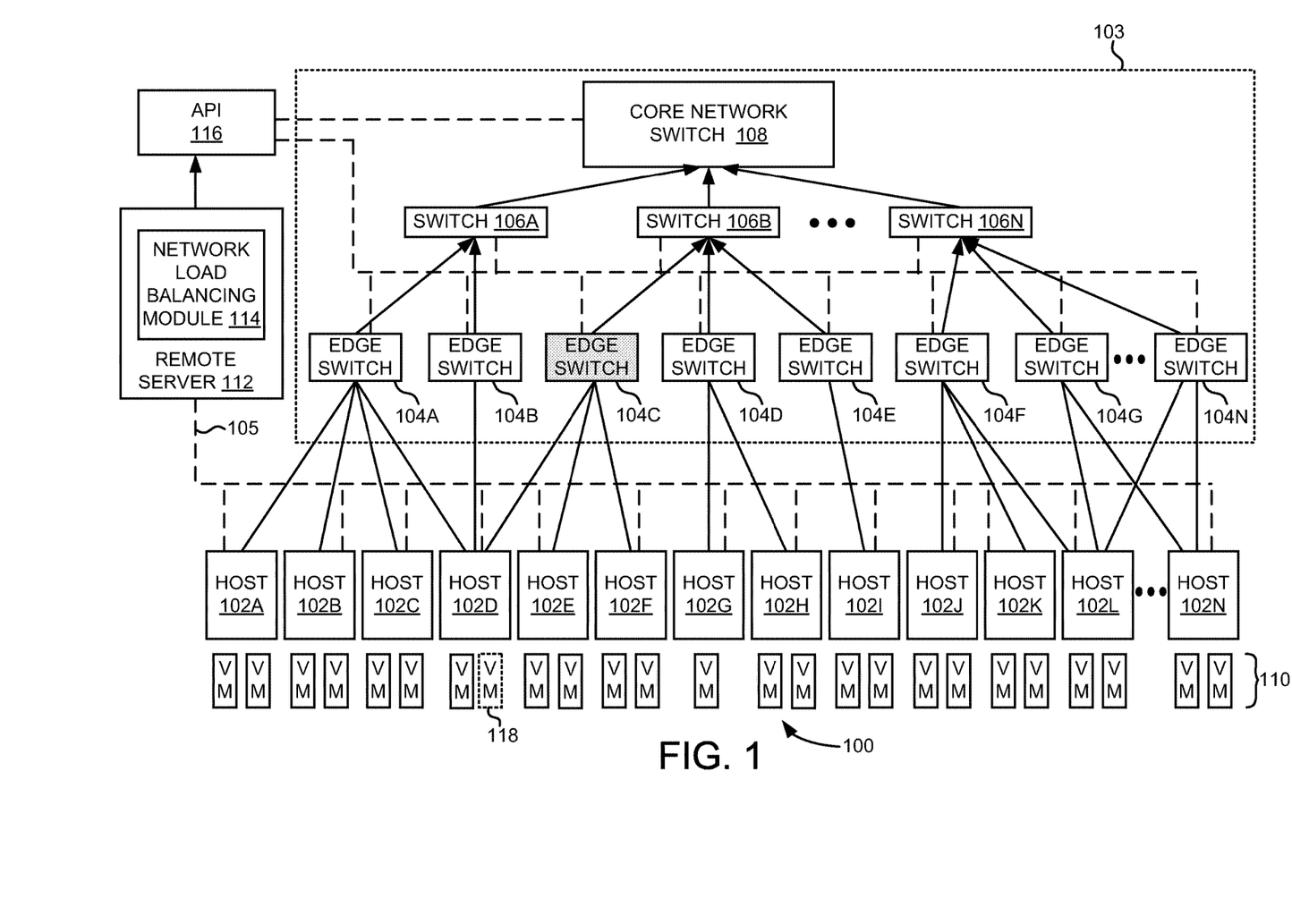
FIG. 1 is an example system view of a virtualized computing environment illustrating placing a virtual machine (VM) based on network traffic at network switches.

FIG. 1 is an example system view 100 of a virtualized computing environment illustrating placing VM 118 based on network traffic at network switches, according to an example embodiment. In the example shown in FIG. 1, the virtualized computing environment includes network fabric 103 showing various network switches that are configured in a hierarchical model (i.e., edge switches 104A-N in a first level, switches 106A-N in a second level, and core network switch 108 in a third level) and their connections. Further, the virtualized computing environment includes host computing systems 102A-N and remote server 112. Each host computing system 102A-N may have one or more VMs 110 running therein. Furthermore, host computing systems 102A-N are coupled to associated network switches 104A-N at the first level, which in turn connected to associated network switches 106A-N at the second level.

Remote server 112 includes network load balancing module 114. One skilled in the art can appreciate that network load balancing module 114 can also be provided in a VM or virtual application that can run on any host computing system and can be provided to a user through a graphical user interface as a part of management software. In operation, network load balancing module 114 receives a request to place VM 118 in the virtualized computing environment. Upon receiving the request, network load balancing module 114 obtains network traffic and a network topology map associated with the network switches. The network topology map here refers to a map showing the relationships between the network switches, virtual switches, host computing systems 102A-N and VMs 110 in the virtualized computing environment.

In one embodiment, network load balancing module 114 determines the network traffic at each network switch 104A-N by measuring network traffic at each virtual switch associated with host computing systems 102A-N (e.g., using connection 105 between network load balancing module 114 and host computing systems 102A-N) and then summing the network traffic at each virtual switch connected to each network switch 104A-N using the network topology map. For example, the network traffic at network switch 104A is determined by summing the network traffic at virtual switches of host computing systems 102A-D, provided that host computing systems 102A-D executing VMs that transmit and receive network traffic via network switch 104A.

In another embodiment, the network traffic at each port of a network switch is determined using an application programming interface (API). Note that a generic block representing API 116 is shown in FIG. 1 for discovering network topology maps and monitoring network statistics, including network traffic at each port of a network switch. However, those skilled in the art will recognize that each managed network switch will have an API that facilitates access to management and monitoring functions. For example, API 116 may implement an industry standard protocol, such as a simple network management protocol (SNMP), in conjunction with a remote monitoring standard, such as remote network monitoring (RMON). RMON versions 1 and 2 provide for monitoring many network attributes, including port utilization, bytes/frames sent/received, collisions, cyclic redundancy check (CRC) errors, traffic statistics for each protocol, and the like. RMON also provides for alarms to be generated based on a variety of metrics. In another example, a link layer discovery protocol (LLDP) is used by network switches 104A-N to advertise their identity, capabilities, and neighbors on an Ethernet local area network (LAN). LLDP can be used to assemble the network topology map. In yet another example, network load balancing module 114 determines the network traffic at each network switch 104A-N by obtaining central processing unit (CPU) load, memory load, backplane bandwidth or network switch fabric speed of network switches 104A-N using API 116 and then determines the network traffic at network switches 104A-N using the obtained CPU load, memory load, backplane bandwidth or network switch fabric speed. For example, the backplane is implemented using logic circuits to move frames between network ports.

Further in operation, network load balancing module 114 determines whether there are any network switches having network load less than a threshold value in the virtualized computing environment. Those skilled in the art will recognize that it might be desirable to define a different threshold value for different network switches. For example, a newer generation network switch may be able to carry more network traffic than an older generation network switch. Also, it may be desirable to vary the threshold value in response to overall network traffic levels. If there are any network switches having network load less than the threshold value, then network load balancing module 114 determines a network switch having network load less than the threshold value. If network switches 104A-N have network load greater than the threshold value, then network load balancing module 114 issues a warning that the network load at network switches 104A-N is greater than the threshold value and determines a network switch having minimum network load.

In the example shown in FIG. 1, network load balancing module 114 determines network switch 104C that is having network load less than the threshold value for placing VM 118. In one embodiment, network load balancing module 114 determines network resource requirement of VM 118. For example, the network resource requirement includes bandwidth requirement, throughput requirement, network latency requirement and the like. Network load balancing module 114 then determines network switch 104C that is having network load less than the threshold value and satisfying the network resource requirement of VM 118.

Furthermore in operation, network load balancing module 114 identifies host computing systems 102D-F that are coupled to network switch 104C using the network topology map. Moreover, network load balancing module 114 determines whether any identified host computing system 102D-F has available computing resources to host VM 118. For example, the computing resources include a central processing unit (CPU), memory and so on.

In the example shown in FIG. 1, host computing systems 102D and 102E have available computing resources to host VM 118 and host computing system 102F does not have available computing resources to host VM 118. Therefore, network load balancing module 114 places VM 118 on host computing system 102D or host computing system 102E using a resource scheduling framework. If host computing systems 102D-F does not have available computing resources to host VM 118, then network load balancing module 114 repeats the steps of determining and placing for a next network switch in the virtualized computing environment.

In the example shown in FIG. 1, network load balancing module 114 places VM 118 on host computing system 102D. In this case, host computing system 102D transmits and receives network traffic associated with VM 118 via network switch 104C. Further, network load balancing module 114 determines whether the network load at network switch 104C is still less than or equal to the threshold value upon placing VM 118 on host computing system 102D. If the network load at network switch 104C is still less than or equal to the threshold value, network load balancing module 114 performs no further action. If the network load at network switch 104C is greater than the threshold value, network load balancing module 114 initiates migration of VM 118 to other host computing system coupled to any other network switch and/or instructs a virtual switch of host computing system 102D to route the network traffic between VM 118 and other network switch based on network traffic at the other network switches.

In one embodiment, network load balancing module 114 determines whether host computing system 102D is coupled to any other network switch using the network topology map. In the example illustrated in FIG. 1, host computing system 102D is also coupled to network switches 104A and 104B. Therefore, network load balancing module 114 instructs the virtual switch of host computing system 102D to route the network traffic between VM 118 and network switch 104A or network switch 104B based on the network traffic at network switch 104A or network switch 104B. In one example, network switch 104A or network switch 104B having network traffic less than the threshold value is selected to route the network traffic associated with VM 118 on host computing system 102D. The resource scheduling framework manages selection of network switch 104A or network switch 104B based on the network traffic. For example, upon instructing the virtual switch associated with host computing system 102D, the virtual switch associated with host computing system 102D is connected to one of physical network interface card (NIC) devices which is connected to network switch 104A or network switch 104B. In this case, VM 118 is connected to a different physical network port that is connected to network switch 104A or network switch 104B. In another example, if network switches 104A and 104B have network load greater than or equal to the threshold value, then migration of VM 118 to other host computing system coupled to any other network switch is initiated.

In yet another example, when VM 118 is placed on host computing system 102E having available computing resources to host VM 118, network load balancing module 114 determines whether the network load at network switch 104C is still less than or equal to the threshold value upon placing VM 118. In the example shown in FIG. 1, host computing system 102E is coupled only to network switch 104C. If the network load at network switch 104C is greater than the threshold value upon placing VM 118 on host computing system 102E, network load balancing module 114 initiates migration of VM 118 to other host computing system coupled to any other network switch.

Figure 2:
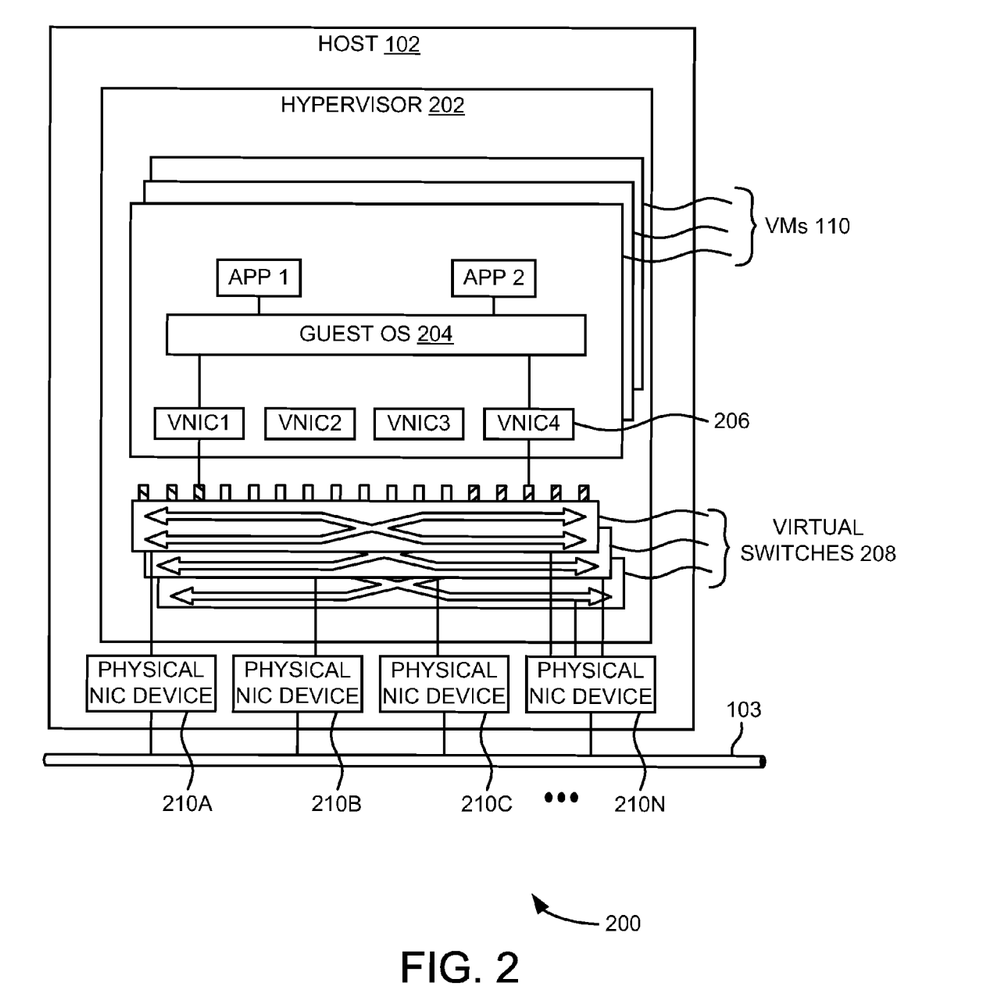
FIG. 2 depicts an example host computing system architecture in which embodiments herein may be practiced.

Referring to FIG. 2, which is architecture 200 of host computing system 102, such as host computing systems 102A-N shown in FIG. 1, in which embodiments herein may be practiced. Host computing system 102 includes hypervisor 202 (i.e., a virtualization layer) that manages assignment of physical host computing system resources to guest operating systems (GOSs) 204. VMs 110 include GOSs 204 executing applications (e.g., APP 1 and APP 2) and multiple virtual network interface cards (VNICs) 206. VNICs 206 are connected to associated virtual switches 208 that provide network switch functionality for the network interfaces. Virtual switches 208 are connected to physical NIC devices 210A-N in host computing system 102 to connect VMs 110 to network fabric 103. In the example shown in FIG. 1, network fabric 103 includes various network switches (e.g., 104A-N and 106A-N) and their connections. Each of physical NIC devices 210A-N is connected to a different network switch (e.g., network switches 104A-N of FIG. 1). In other words, if host computing system 102 includes two or more physical NIC devices, then host computing system 102 can connect to two or more network switches and if host computing system 102 includes one physical NIC device, then host computing system 102 can only connect to one network switch. Note that NICs having multiple ports are known in the art. A similar configuration implemented with multi-port NICs may have two or more ports of a single NIC connected to different network switches.

Figure 3:
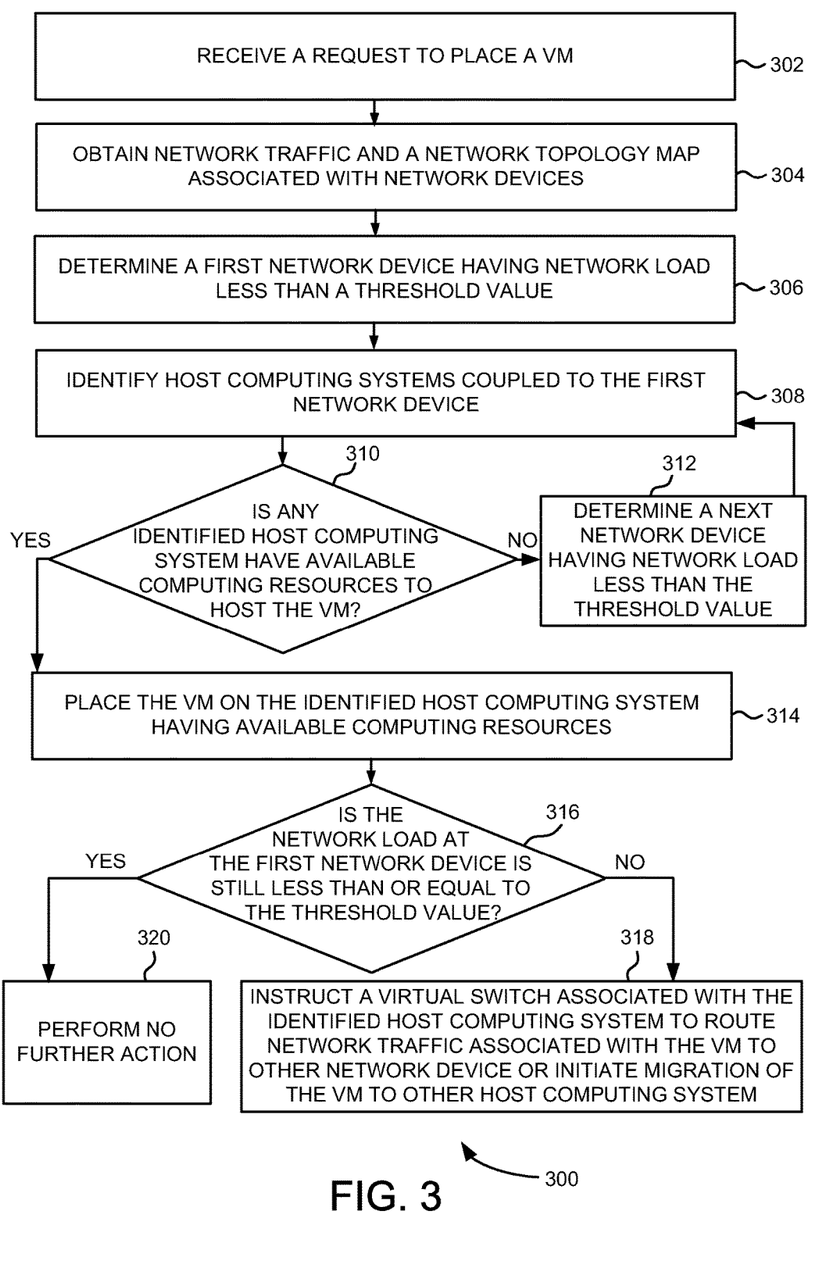
FIG. 3 is a flow diagram of an example method for placing a VM in a virtualized computing environment based on network traffic at network switches.

FIG. 3 is a flow diagram 300 of an example method for placing a VM in a virtualized computing environment. In one example, the virtualized computing environment includes host computing systems. Further, each host computing system has VMs running therein and each host computing system is coupled to one or more network devices. For example, the network device refers to any device capable of routing/clearing the network traffic such as routers, switches, home gateway router, modem and so on.

At block 302, a request to place the VM in the virtualized computing environment is received. At block 304, network traffic and a network topology map associated with the network devices are obtained. In one example, the network traffic and the network topology map associated with the network devices are obtained using an API as described above in more detail with reference to FIG. 1. One skilled in the art can envision that any other interfaces, protocols, and mechanisms can also be used for discovering network topology maps and monitoring network statistics. The network topology map refers to a map showing the relationship between the network devices, host computing systems and VMs in the virtualized computing environment. The network traffic is the traffic that is transmitted and received via the network devices.

At block 306, a first network device having network load less than a threshold value is determined. In one example embodiment, a check is made to determine whether there are any network devices having network load less than the threshold value in the virtualized computing environment. If there are any network devices having network load less than the threshold value, the first network device having network load less than the threshold value is determined. If the network devices have network load greater than the threshold value, a warning, that the network load at the network devices is greater than the threshold value, is issued and a network device having minimum network load is determined.

In one embodiment, network resource requirement of the VM (i.e., the VM to be placed) is determined. For example, the network resource requirement includes bandwidth requirement, throughput requirement, network latency requirement and the like. The first network device having network load less than the threshold value and satisfying the network resource requirement of the VM is then determined.

At block 308, host computing systems coupled to the first network device are identified using the network topology map. At block 310, a check is made to determine whether any of the identified host computing systems has available computing resources to host the VM. For example, the computing resources include a CPU and memory.

At block 312, if the identified host computing systems coupled to the first network device do not have available computing resources to host the VM, a next network device having network load less than the threshold value is determined and the process steps from 308 are repeated. At block 314, if any of the identified host computing systems has available computing resources to host the VM, the VM is placed on one of the identified host computing systems having available computing resources. In this case, the one of the identified host computing system transmits and receives network traffic associated with the VM via the first network device. For example, the one of the identified host computing system is selected using a resource scheduling framework.

At block 316, a check is made to determine whether the network load at the first network device is still less than or equal to the threshold value upon placing the VM. At block 318, if the network load at the first network device is greater than the threshold value, initiating migration of the VM to other host computing system coupled to any other network device and/or instructing a virtual switch of the one of the identified host computing system to route the network traffic between the VM and a second network device is performed.

In one embodiment, a check is made to determine whether the one of the identified host computing system is coupled to any other network device using the network topology map. If the one of the identified host computing system is not coupled to any other network device, the migration (e.g., live migration) of the VM to the other host computing system coupled to any other network device is initiated. A resource scheduling framework selects the other host computing system based on network traffic at the other network device and availability of computing resources (e.g., CPU and memory) at the other host computing system. In other words, an underutilized network device is determined from the other network devices to initiate migration of the VM to the other host computing system that is coupled to the underutilized network device.

If the one of the identified host computing system is coupled to any other network device, the virtual switch of the one of the identified host computing system is instructed to route the network traffic between the VM and the second network device. The resource scheduling framework manages selection of the second network device based on the network traffic. For example, if the one of the identified host computing system is coupled to a second network device and a third network device, then the virtual switch of the one of the identified host computing system is instructed to route the network traffic between the VM and one of the second and third network devices based on the network traffic at the second and third network devices. In other words, the second device or third network device having network load less than the threshold value is selected to route the network traffic associated with the VM placed on the one of the identified host computing system. In another example, if the second network device and third network device have network load greater than or equal to the threshold value, then migration of the VM to other host computing system coupled to any other network device is initiated. At block 320, if the network load at the first network device is still less than or equal to the threshold value upon placing the VM, no further action is performed.

The above steps 302-320 describe placing a single VM in a virtualized computing environment, however, when there is requirement for placing multiple VMs, the above steps can be performed in sequential or parallel for placing multiple VMs in the virtualized computing environment.

In various embodiments, systems and methods described in FIGS. 1 through 3 provides a technique to place the VM in the virtualized computing environment. Using this technique, the network load at the network switches can be balanced by considering network traffic at the network switches while allocating computing resources to the newly created VM in the virtualized computing environment.

Figure 4:
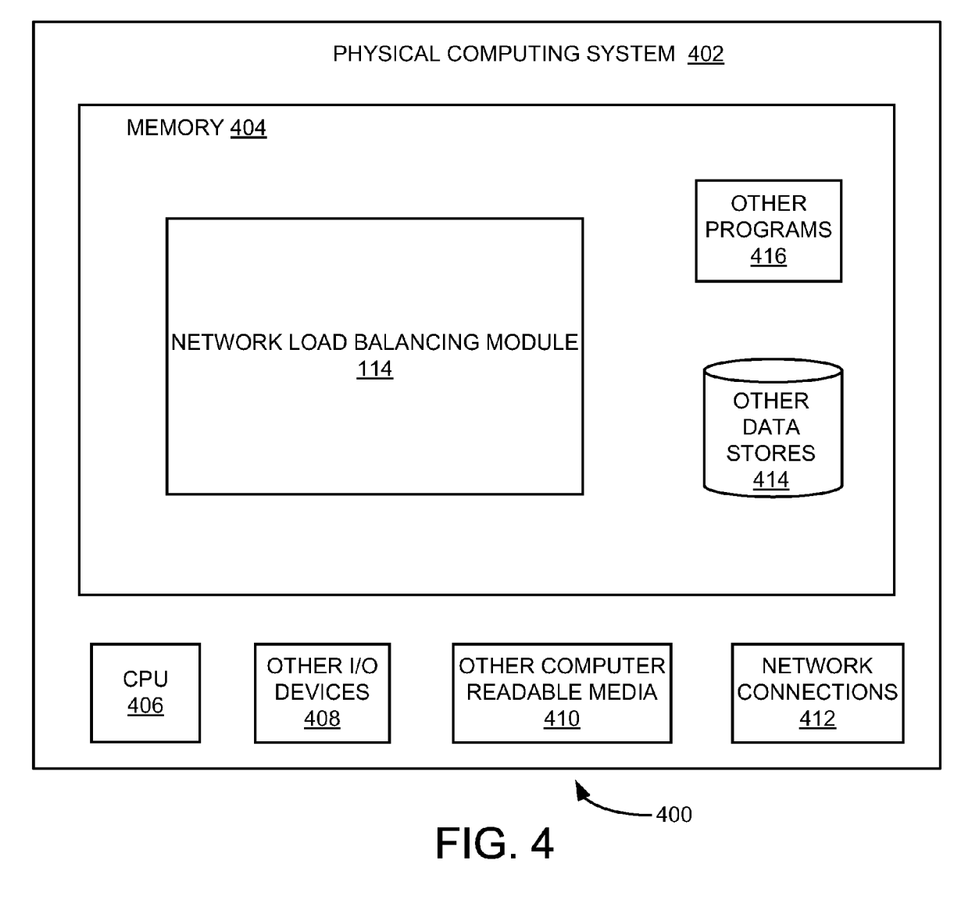
FIG. 4 is a block diagram of an example physical computing system for implementing a network load balancing module, such as the one shown in FIG. 1.

FIG. 4 is a block diagram 400 of an example physical computing system for implementing a network load balancing module, such as the one shown in FIG. 1. In particular, FIG. 4 shows physical computing system 402 (e.g., remote server 112 as shown in FIG. 1) that may be utilized to implement network load balancing module 114.

Note that one or more general purpose virtual or physical computer systems suitably instructed may be used to implement network load balancing module 114. In addition, physical computing system 402 may comprise one or more distinct computing systems/devices and may span distributed locations. Furthermore, each block shown may represent one or more such blocks as appropriate to a specific embodiment or may be combined with other blocks. Also, network load balancing module 114 may be implemented in software, hardware, firmware, or in some combination to achieve the capabilities described herein.

In the embodiment shown, physical computing system 402 may comprise computer memory ("memory") 404, one or more CPUs 406, input/output (I/O) devices 408 (e.g., keyboard, mouse, etc.), other computer-readable media 410, and network connections 412. Network load balancing module 114 is shown residing in memory 404. Network load balancing module 114 may execute on one or more CPUs 406 and implement techniques described herein. Other code or programs 416 (e.g., an administrative interface, a Web server, and the like) and potentially other data repositories, such as data store 414, may also reside in memory 404, and execute on one or more CPUs 406. One or more of the components in FIG. 4 may not be present in any specific implementation. For example, some embodiments may not provide other computer readable media 410. Further, some embodiments may provide a display in physical computing system 402.

Network load balancing module 114 interacts via a network with host computing systems. The network may be any combination of media (e.g., twisted pair, coaxial, fiber optic, radio frequency), hardware (e.g., routers, switches, repeaters, transceivers), and protocols (e.g., transmission control protocol/Internet protocol (TCP/IP), user datagram protocol (UDP), Ethernet, Wi-Fi, worldwide interoperability for microwave access (WiMAX)) that facilitate communication to and from remotely situated humans and/or devices. As discussed, network load balancing module 114 places a VM in the virtualized computing environment.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of network load balancing module 114, such as in data store 414, can be available by standard mechanisms such as through C, C++, C#, and Java APIs, libraries for accessing files, databases, or other data repositories, through scripting languages such as extensible mark up language (XML), or through Web servers, file transfer protocol (FTP) servers, or other types of servers providing access to stored data. Data store 414 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, hyper text transfer protocol (HTTP), web services (XML-based remote procedure call (XML-RPC), Java API for XML-based remote procedure call (JAX-RPC), simple object access protocol (SOAP), and the like). Other variations are possible. Also, other functionality could be provided by each component/module, or existing functionality could be distributed amongst the components/modules in different ways, yet still achieve the functions described herein.

Furthermore, in some embodiments, some or all of the components of network load balancing module 114 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for placing the VM in the virtualized computing environment are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for placing a virtual machine (VM) in a virtualized computing environment comprising:
   determining network traffic at network switches upon receiving a request to place the VM in the virtualized computing environment, wherein the network switches route or carry the network traffic to and from VMs running in a plurality of host computing systems;
   determining a first network switch having network load less than a threshold value based on the determined network traffic at the network switches; and
   placing the VM on a host computing system coupled to the first network switch that is having network load less than the threshold value, wherein the first network switch routes or carries the network traffic associated with the VM placed on the host computing system, wherein placing the VM on the host computing system comprises:
   identifying host computing systems coupled to the first network switch;
   determining whether any of the identified host computing systems coupled to the first network switch has available computing resources to host the VM; and
   if so, placing the VM on one of the identified host computing systems having available computing resources to host the VM.

2. The method of claim 1, further comprising:
   if none of the identified host computing systems coupled to the first network switch has available computing resources to host the VM, determining a second network switch having network load less than the threshold value based on the determined network traffic at the network switches; and
   placing the VM on a host computing system coupled to the second network switch that is having network load less than the threshold value, wherein the second network switch routes or carries the network traffic associated with the VM.

3. The method of claim 1, wherein the one of the identified host computing system is selected using a resource scheduling framework.

4. The method of claim 1, wherein the computing resources include a central processing unit (CPU) and memory.

5. The method of claim 1, wherein the network resource requirement includes at least one of bandwidth requirement, throughput requirement and network latency requirement.

6. The method of claim 1, wherein determining the first network switch having network load less than the threshold value comprises:
   determining network resource requirement of the VM; and
   determining the first network switch having network load less than the threshold value and satisfying the network resource requirement of the VM.

7. A method for placing a virtual machine (VM) in a virtualized computing environment comprising:
   determining a first network switch having network load less than a threshold value;
   placing the VM on a host computing system coupled to the first network switch that is having network load less than the threshold value, wherein the host computing system transmits and receives network traffic associated with the VM via the first network switch, wherein placing the VM on the host computing system comprises:
   identifying host computing systems coupled to the first network switch;
   determining whether any of the identified host computing systems coupled to the first network switch has available computing resources to host the VM; and
   if so, placing the VM on one of the identified host computing systems having available computing resources to host the VM;
   determining an undated network load at the first network switch upon placing the VM;
   determining whether the updated network load at the first network switch is still less than or equal to the threshold value upon placing the VM; and
   if the updated network load at the first network switch is greater than the threshold value, performing at least one of initiating migration of the VM to other host computing system coupled to any other network switch and instructing a virtual switch of the host computing system to route the network traffic between the VM and a second network switch.

8. The method of claim 7, further comprising:
if the undated network load at the first network switch is less than or equal to the threshold value, performing no further action.

9. A system comprising:
a plurality of network switches;
a plurality of host computing systems; and
a remote server comprising at least one processor and a memory communicatively coupled to the processor wherein the memory comprises of a network load balancing module to place a virtual machine (VM) in a virtualized computing environment, by:
determining network traffic at the plurality of network switches upon receiving a request to place the VM in the virtualized computing environment, wherein the network switches route or carry the network traffic to and from VMs running in the plurality of host computing systems;
determining a first network switch having network load less than a threshold value based on the determined network traffic at each of the plurality of network switches; and
placing the VM on a host computing system coupled to the first network switch that is having network load less than the threshold value, wherein the first network switch routes or carries the network traffic associated with the VM placed on the host computing system, wherein the network load balancing module is configured to:
identify host computing systems coupled to the first network switch;
determine whether any of the identified host computing systems coupled to the first network switch has available computing resources to host the VM; and
if so, place the VM on one of the identified host computing systems having available computing resources to host the VM.

10. The system of claim 9, wherein the network load balancing module is further configured to:
determine a second network switch having network load less than the threshold value based on the determined network traffic at the network switches, if none of the identified host computing systems coupled to the first network switch has available computing resources to host the VM; and
place the VM on a host computing system coupled to the second network switch that is having network load less than the threshold value, wherein the second network switch routes or carries the network traffic associated with the VM.

11. The system of claim 9, wherein the one of the identified host computing system is selected using a resource scheduling framework.

12. The system of claim 9, wherein the computing resources include a central processing unit (CPU) and memory.

13. The system of claim 9, wherein the network resource requirement includes at least one of bandwidth requirement, throughput requirement and network latency requirement.

14. The system of claim 9, wherein the network load balancing module is configured to:
determine network resource requirement of the VM; and
determine the first network switch having network load less than the threshold value and satisfying the network resource requirement of the VM.

15. A system comprising:
a plurality of network switches;
a plurality of host computing systems; and
a remote server comprising at least one processor and a memory communicatively coupled to the processor wherein the memory comprises of a network load balancing module to place a virtual machine (VM) in a virtualized computing environment, wherein the network load balancing module is configured to:
determine a first network switch having network load less than a threshold value;
place the VM on a host computing system coupled to the first network switch that is having network load less than the threshold value, wherein the host computing system transmits and receives network traffic associated with the VM via the first network switch, wherein the network load balancing module is configured to:
identify host computing systems coupled to the first network switch;
determine whether any of the identified host computing systems coupled to the first network switch has available computing resources to host the VM; and
if so, place the VM on one of the identified host computing systems having available computing resources to host the VM;
determine an updated network load at the first network switch upon placing the VM;
determine whether the updated network load at the first network switch is still less than or equal to the threshold value upon placing the VM; and
perform at least one of initiating migration of the VM to other host computing system coupled to any other network switch and instructing a virtual switch of the host computing system to route the network traffic between the VM and a second network switch, if the updated network load at the first network switch is greater than the threshold value.

16. The system of claim 15, wherein the network load balancing module is further configured to:
perform no further action, if the updated network load at the first network switch is less than or equal to the threshold value.

17. A non-transitory computer-readable storage medium including instructions that are configured, when executed by a computing device, to perform placement of a virtual machine (VM) in a virtualized computing environment comprising:
determining network traffic at network switches upon receiving a request to place the VM in the virtualized computing environment, wherein the network switches route or carry the network traffic to and from VMs running in a plurality of host computing systems;
determining a first network switch having network load less than a threshold value based on the determined network traffic at the network switches; and
placing the VM on a host computing system coupled to the first network switch that is having network load less than the threshold value, wherein the first network switch routes or carries the network traffic associated with the VM placed on the host computing system, wherein placing the VM on the host computing system comprises:
identifying host computing systems coupled to the first network switch;

determining whether any of the identified host computing systems coupled to the first network switch has available computing resources to host the VM; and if so, placing the VM on one of the identified host computing systems having available computing resources to host the VM.

18. The non-transitory computer-readable storage medium of claim 17, further comprising:

if none of the identified host computing systems coupled to the first network switch has available computing resources to host the VM, determining a second network switch having network load less than the threshold value based on the determined network traffic at the network switches; and placing the VM on a host computing system coupled to the second network switch that is having network load less than the threshold value, wherein the second network switch routes or carries the network traffic associated with the VM placed on the host computing system.

19. The non-transitory computer-readable storage medium of claim 17, wherein the one of the identified host computing system is selected using a resource scheduling framework.

20. The non-transitory computer-readable storage medium of claim 17, wherein the computing resources include a central processing unit (CPU) and memory.

21. The computer-readable storage medium of claim 17, wherein the network resource requirement includes at least one of bandwidth requirement, throughput requirement and network latency requirement.

22. The non-transitory computer readable storage medium of claim 17, wherein determining the first network switch having network load less than the threshold value comprises:

determining network resource requirement of the VM; and determining the first network switch having network load less than the threshold value and satisfying the network resource requirement of the VM.

23. A non-transitory computer-readable storage medium including instructions that are configured, when executed by a computing device, to perform placement of a virtual machine (VM) in a virtualized computing environment comprising:

determining a first network switch having network load less than a threshold value;

placing the VM on a host computing system coupled to the first network switch that is having network load less than the threshold value, wherein the host computing system transmits and receives network traffic associated with the VM via the first network switch, wherein placing the VM on the host computing system comprises:

identifying host computing systems coupled to the first network switch;

determining whether any of the identified host computing systems coupled to the first network switch has available computing resources to host the VM; and if so, placing the VM on one of the identified host computing systems having available computing resources to host the VM;

determining an updated network load at the first network switch upon placing the VM;

determining whether the updated network load at the first network switch is still less than or equal to the threshold value upon placing the VM; and if the updated network load at the first network switch is greater than the threshold value, performing at least one of initiating migration of the VM to other host computing system coupled to any other network switch and instructing a virtual switch of the host computing system to route the network traffic between the VM and a second network switch.

24. The non-transitory computer-readable storage medium of claim 23, further comprising:

if the updating network load at the first network switch is still less than or equal to the threshold value, performing no further action.

* * * * *